United States Patent [19]
Wenzel et al.

[11] Patent Number: 5,252,283
[45] Date of Patent: Oct. 12, 1993

[54] EXTRUSION METHOD

[75] Inventors: Edward J. Wenzel, Troy; Donald L. Franck, Warren, both of Mich.

[73] Assignee: General Motors Corporation, Detroit, Mich.

[21] Appl. No.: 938,108

[22] Filed: Aug. 31, 1992

[51] Int. Cl.⁵ .................................. B29C 47/88
[52] U.S. Cl. .................. 264/177.170; 264/177.19; 264/177.20; 264/178 R; 425/378.1
[58] Field of Search ............... 264/177.17, 177.19, 264/177.16, 177.10, 178 R, 323, 177.20; 425/378.1, 379.1, 325, 327

[56] References Cited

U.S. PATENT DOCUMENTS

| | | | |
|---|---|---|---|
| 2,728,104 | 12/1955 | Fisch | 264/178 R |
| 3,444,289 | 5/1969 | Hedberg et al. | 425/363 |
| 3,544,665 | 12/1970 | Bowers | 264/174 |
| 3,551,545 | 12/1970 | Overdiep | 264/323 |
| 3,868,436 | 2/1975 | Ootsuji et al. | 264/174 |
| 3,985,847 | 10/1976 | Hyun | 425/325 |
| 4,167,431 | 9/1979 | Wong | 264/178 R |
| 4,849,045 | 7/1989 | Schmidt | 264/177.17 |
| 5,061,335 | 10/1991 | Tamura et al. | 264/177.1 |

FOREIGN PATENT DOCUMENTS

| | | | |
|---|---|---|---|
| 46-5073 | 2/1971 | Japan | 264/177.17 |
| 54-111563 | 8/1979 | Japan | 264/178 R |
| 60-99633 | 6/1985 | Japan | 264/177.10 |

*Primary Examiner*—Jeffery Thurlow
*Attorney, Agent, or Firm*—Randy W. Tung

[57] ABSTRACT

A method of extrusion of a profiled strip of plastic material having a smooth surface finish without any shock line defects by riding the plastic strip on a unidirectionally rotatable roller positioned between the extrusion die lips and the water cooling bath.

8 Claims, 1 Drawing Sheet

EXTRUSION METHOD

FIELD OF THE INVENTION

This invention generally relates to a method of extrusion of a profiled strip of plastic material and, more particularly, relates to a method of extrusion of a profiled strip of plastic material having a smooth surface finish without any shock line defects.

BACKGROUND OF THE INVENTION

Profiled strips extruded of plastic materials are widely used in automobile body applications as protective molding pieces. Molding pieces such as body side moldings or wheel well moldings are used to protect a vehicle body from impact damage and to protect edges of sheet metal panels from corrosion. Most of these molding pieces are extruded of thermoplastic materials such as PVC (poly vinyl chloride), thermoplastic rubber, thermoplastic urethane, or other flexible plastic materials. PVC is one of the most widely used materials for its low cost and good physical properties.

Molding pieces such as a body side molding may be extruded of a plastic material alone or extruded in an extrusion coating process where plastic material is extruded on a metal reinforcing substrate. In an extrusion coating process where plastic material is combined with a more rigid metal substrate, a cross-head extrusion technique is used. In a cross-head extrusion process, a continuous length of metal reinforcing substrate is pulled through an extrusion die at 90° angle to the direction of the plastic flow when molten plastic material is being extruded onto the metal substrate. The metal reinforcing substrate is usually cleaned and dried through a multi-station surface treatment process and formed by a series of metal roll formers prior to the entry into the extrusion die.

In automobile body parts, the aesthetic appearance of the part is one of the most important criteria that must be satisfied. In the extrusion of vinyl or vinyl/metal substrate reinforced molding pieces, the quality of the surface appearance of the molding pieces obtained is dependent upon many variables. For instance, these variables include the material composition, the extrusion temperature, the extrusion pressure, the extrusion rate, the cooling rate, etc. Minor irregularities in the extrusion conditions can cause surface imperfections in the molding pieces such as shock lines, shock marks, or ripples. They normally show up as lines or ripples across the extrudate 90° to the extrusion direction. These unsightly lines destroy the aesthetic appearance of the extrudate and frequently result in the scrap of the molding pieces.

It is, therefore, an object of the present invention to provide a method of extrusion of profiled extrudates of plastic material having a desirable smooth surface finish.

It is another object of the present invention to produce profiled extrudate of polymeric material that has substantially no surface defects of shock lines, shock marks or ripples.

It is a further object of the present invention to produce profiled extrudate of plastic material having smooth aesthetic surface finish achievable by a simple process modification.

SUMMARY OF THE INVENTION

The aforementioned objects can be achieved by the practice of our novel method of extrusion.

Profiled extrudates are normally distinguished by a smooth highly aesthetic surface which requires maximum surface quality. The shock line or ripple defects which are frequently seen on extrudate would completely destroy the aesthetic appearance of the extrudate and result in the scrap of the part. We have discovered that the cause of the shock lines or ripples on the aesthetic surface of an extrudate is a result of an irregular movement of the extrudate downstream from the extrusion die. The shock lines are a result of an energy pulse transmitted through the extrudate to the last point of the plastic melt, i.e., the extrusion die lips, before the extrudate is cooled down to hold its permanent shape.

We have found a solution to the shock line problem by riding the extrudate on a unidirectionally rotatable roller positioned between the extrusion die lips and the water cooling bath. The energy pulse caused by any irregular movement of the extrudate downstream, i.e., any erratic motion in the pull rolls or in the water bath, is dampened and absorbed by the roller such that the energy pulse never reaches the extrudate at the extrusion die lips. We have found that this unidirectionally rotatable roller equipped with a special anti-reverse braking means effectively eliminates the shock line or ripple defects in our profile extrusion process.

BRIEF DESCRIPTION OF THE DRAWINGS

Further objects, features and advantages of this invention will become apparent from a consideration of the following description, the appended claims, and the accompanying drawings in which:

DETAILED DESCRIPTION OF THE PREFERRED EMBODIMENT

Figure 1:
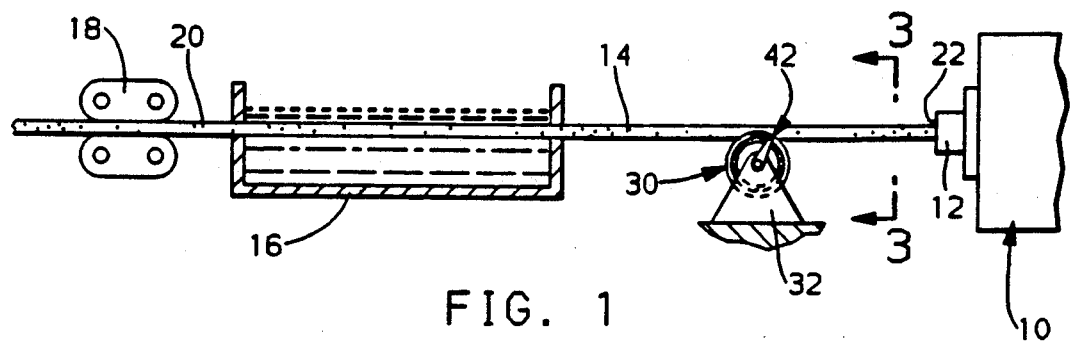
FIG. 1 is an illustration of an in-line extrusion process wherein a unidirectionally rotatable roller is used to eliminate shock line formations.

Referring initially to FIG. 1 where an illustration of an in-line extrusion process is shown in which a unidirectionally rotatable roller is used to eliminate shock line formations. An extruder 10 is used to produce extrudate 14 through extrusion die 12. The cooled extrudate 20 after the water cooling tank 16 is pulled by a constant speed pull roll 18.

In a normal extrusion process any disturbance or erratic motion of the cooled extrudate 20 occurred either in the pull rolls 18 or in the water cooling tank 16 produces an energy pulse which travels back toward the extrusion die 12. Once the extrudate 14 enters the water cooling tank 16, the shape of the extrudate is frozen permanently. The only place where this pulse of energy can cause problems is where the extrudate 14 is still in its plastic molten state at the extrusion die lip 22. The pulse of energy, therefore, is transmitted through the cooled extrudate 20 and absorbed by the plastic melt at the extrusion die lip 22 in the form of disturbance or line formations on the surface of the extrudate 14. Lines or ripples caused by this pulse of energy remain frozen in the surface of the extrudate as a permanent defect once the extrudate 14 enters the water cooling tank 16.

Our invention is the strategic placement of a unidirectionally rotatable roller 30 mounted on a mounting bracket 32 at a location between the extruder die lip 22 and the water cooling tank 16. It is preferred that this roller 30 be mounted at a location close to the extrusion die lip 22, i.e., a distance of approximately 1 to 5 inches. The unidirectionally rotatable roller 30 acts as an dampening device or energy absorber which dampens out the pulse of energy generated by downstream erratic movement of the extrudate and thus eliminates any potential shock line formations.

Figure 2:
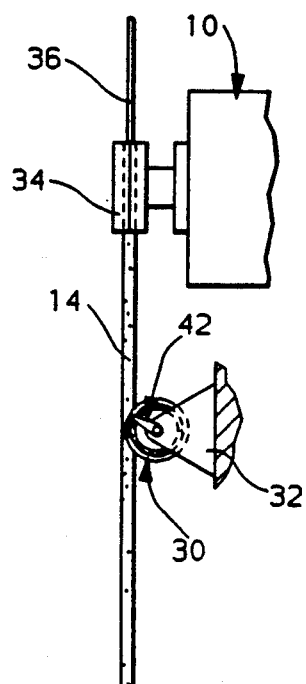
FIG. 2 is an illustration of a cross-head extrusion process in which a unidirectionally rotatable roller is used to eliminate the shock line defects.

A similar arrangement used in cross-head extrusion is shown in FIG. 2. The cross-head extrusion die 34 replaces the in-line extrusion die 12 in FIG. 1. In this cross-head extrusion coating process, a metal reinforcing foil 36 is fed through the cross-head extrusion die 34 such that plastic melt is coated on the metal reinforcing foil 36.

Figure 3:
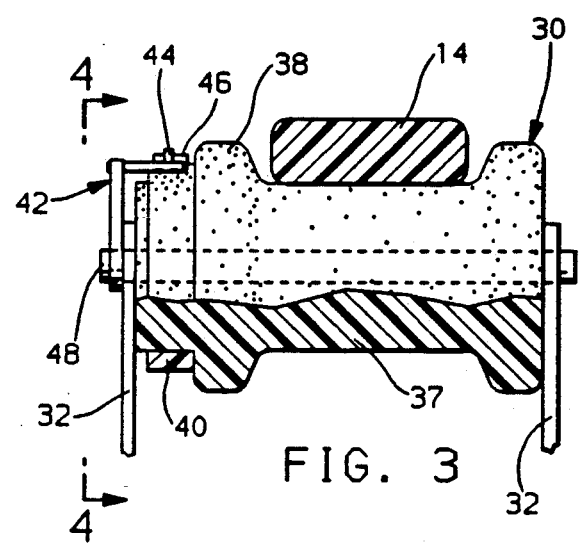
FIG. 3 is an enlarged view of the unidirectionally rotatable roller equipped with an anti-reverse braking means.
Figure 4:
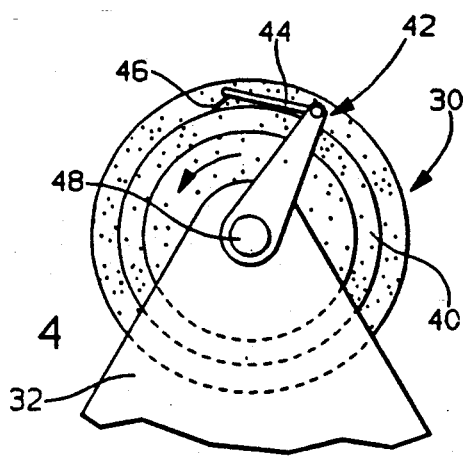
FIG. 4 is an enlarged end view of the unidirectionally rotatable roller equipped with the anti-reverse braking means.

A detailed enlarged drawing of roller 30 is shown in FIGS. 3 and 4. Since the surface of the extrudate 14 at the contact point with the unidirectionally rotatable roller 30 is still tacky, the roller 30 is used always to contact the non-aesthetic surface of the extrudate. In order to contact the slightly tacky extrudate, nylon was found to be a suitable material for the roller 30. A groove 37 is cut into the roller surface 38 to help guide the extrudate 14 on the roller. To further improve the unidirectional rotation of the roller, we have also used an anti-reverse braking means on the roller. This is shown as 40 and 42 in FIG. 3. A braking roller 40 molded of a softer material, such as polyurethane elastomer having a hardness between 20 to 70 durometer can be used. In FIG. 4 where an enlarged end view of the roller 30 and the braking roller 40 is shown, the roller 30 and the braking roller 40 are mounted on the same axis 48. A spring-loaded braking arm 44 is pressed against the braking roller 40 such that a spring steel brake 46 is pushed against the surface of braking roller 40. The spring steel brake 46 has great sensitivity and stops any reverse motion of braking roller 40. When a pulse of energy is telegraphed through the cooled extrudate 20 and travels back through the material to roller 30, it tries to twist the roller by a small break pressure. The tendency of an object to continue in motion, i.e., the roller 30 to continue rotating in its direction of rotation thus absorbs and completely nullifies the energy pulse transmitted from the extrudate downstream.

We have found that a suitable diameter of roller 30 is about between 2 to 5 inches and the suitable diameter of the braking roller 40 is normally slightly smaller than roller 30.

Our novel invention of the unidirectionally rotatable roller placed at near the extrusion die lip completely eliminates the formation of shock lines, shock marks, or ripples on the aesthetic surface of the extrudate in an extrusion process. It should be emphasized that other possible embodiments of the unidirectionally rotatable roller may work equally well and, therefore, are within the spirit of the present invention.

The embodiments of the invention in which an exclusive property or privilege is claimed are defined as follows:

1. In a method of extruding plastic materials through a heated extrusion shaping die into an extrudate strip, said strip having an aesthetic surface and an opposing surface, the aesthetic surface having a surface finish susceptible to shock line defects caused by erratic downstream motions of said extrudate, the improvement comprises riding the opposing surface of said extrudate on a unidirectionally rotatable roller prior to entering a cooling station such that any downstream erratic motion is dampened and absorbed by said roller and the formation of any shock lines on said aesthetic surface is obviated.

2. A method of extruding plastic materials through a heated extruder barrel and a heated extrusion shaping die into an extrudate strip, said strip having an aesthetic surface and an opposing surface, the aesthetic surface having a predetermined surface finish without any shock line defects comprising the steps of melting a quantity of a plastic material in the extruder barrel, feeding said molten plastic through a heated extrusion shaping die forming an extrudate with said aesthetic surface having a predetermined surface finish, riding said opposing surface of said extrudate on a unidirectionally rotatable roller capable of rotation only in the direction of said extrusion, thereafter cooling said extrudate in a cooling station, and pulling said extrudate by a pulling means whereby said decorative surface maintains its predetermined surface finish without the shock line defects.

3. In a method of extruding plastic materials through a heated extrusion shaping die into an extrudate strip, said strip having an aesthetic surface and an opposing surface, the aesthetic surface having a surface finish susceptible to shock line defects caused by erratic downstream motions of said extrudate, the improvement comprises riding the opposing surface of said extrudate on a unidirectionally rotatable roller equipped with an anti-reverse braking means prior to entering a cooling station such that any downstream erratic motion is dampened and absorbed by said roller and the formation of any shock lines on said extrudate is obviated.

4. In the method of claim 3, said method of extruding plastic materials through a heated extrusion shaping die being an in-line extrusion method.

5. In the method of claim 3, said method of extruding plastic materials through a heated extrusion shaping die being a cross-head extrusion method.

6. A method of extruding plastic materials through a heated extruder barrel and a heated extrusion shaping die into an extrudate strip, said strip having an aesthetic surface and an opposing surface, the aesthetic surface having a predetermined surface finish without any shock line defects and pulling said extrudate by a pulling means comprising the steps of melting a quantity of a plastic material in the extruder barrel, feeding said molten plastic through a heated extrusion shaping die forming an extrudate having a predetermined surface finish, riding the opposing surface of said extrudate on a unidirectionally rotatable roller equipped with an anti-reverse braking means, thereafter cooling said extrudate in a cooling station, and pulling said extrudate by said pulling means whereby said extrudate maintains its predetermined surface finish without the shock line defects.

7. In the method of claim 6, said method of extruding plastic materials being an in-line extrusion method.

8. In the method of claim 6, said method of extruding plastic materials being a cross-head extrusion method.

* * * * *